United States Patent
Yoshida

(10) Patent No.: US 8,795,917 B2
(45) Date of Patent: Aug. 5, 2014

(54) FUEL CELL SYSTEM WITH CONTROL OF THE PRESSURE OF THE REACTANTS WITHIN THE SYSTEM

(75) Inventor: Naohiro Yoshida, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 103 days.

(21) Appl. No.: 11/884,932

(22) PCT Filed: Apr. 4, 2006

(86) PCT No.: PCT/JP2006/307515
§ 371 (c)(1),
(2), (4) Date: Aug. 23, 2007

(87) PCT Pub. No.: WO2006/109756
PCT Pub. Date: Oct. 19, 2006

(65) Prior Publication Data
US 2008/0166611 A1 Jul. 10, 2008

(30) Foreign Application Priority Data
Apr. 6, 2005 (JP) ................ 2005-109858

(51) Int. Cl.
*H01M 8/04* (2006.01)
*H01M 8/10* (2006.01)

(52) U.S. Cl.
CPC ...... *H01M 8/04104* (2013.01); *H01M 8/04201* (2013.01); *H01M 8/04388* (2013.01); *H01M 8/04432* (2013.01); *H01M 8/04753* (2013.01); *H01M 8/04783* (2013.01); *H01M 8/04447* (2013.01); *H01M 8/04925* (2013.01); *H01M 8/1018* (2013.01); *H01M 2250/20* (2013.01); *H01M 2250/10* (2013.01)
USPC ............ 429/446; 429/513; 429/512; 429/430

(58) Field of Classification Search
CPC . H01M 8/04097; H01M 8/041; H01M 8/044; H01M 8/047; H01M 8/04; H01M 8/04082–8/04089; H01M 8/04104; H01M 8/04201; H01M 8/0438; H01M 8/04388; H01M 8/04432; H01M 8/04746; H01M 8/04753; H01M 8/04783; H01M 8/10; H01M 8/1018; H01M 2008/1095; H01M 2250/10; H01M 2250/20
USPC .................. 429/443, 444, 446, 430, 512, 513
See application file for complete search history.

(56) References Cited

U.S. PATENT DOCUMENTS

| | | | |
|---|---|---|---|
| 2004/0018404 A1* | 1/2004 | Kojima et al. | 429/22 |
| 2004/0241504 A1* | 12/2004 | Summers et al. | 429/13 |
| 2005/0061371 A1* | 3/2005 | Kimbara et al. | 137/266 |

FOREIGN PATENT DOCUMENTS

| | | |
|---|---|---|
| DE | 100 50 981 A1 | 4/2002 |
| DE | 103 11 786 A1 | 9/2004 |
| JP | 63-213262 A | 9/1988 |

(Continued)

*Primary Examiner* — Edu E Enin-Okut
(74) *Attorney, Agent, or Firm* — Kenyon & Kenyon LLP

(57) ABSTRACT

The present invention provides a fuel cell system that controls a pressure for a fuel gas supplied to a fuel cell so that the anode-cathode differential pressure between an anode and a cathode of a fuel cell is maintained within a predetermined range, in order to provide a desired generation amount while reducing the amount of fuel gas discharged to the exterior of the system even if it is difficult to provide an appropriate fuel gas supply amount for a fuel cell load (the generation requirement on the cell). If the system determines that the amount of fuel gas supplied to the fuel cell is less than an appropriate required gas amount for the load (generation requirement) (step S9: NO), for example, if the concentration of nitrogen in the fuel gas reaches a predetermined value or greater, the open and close state of shut-off valves H3, H3A is switched to increase the pressure for the fuel gas supplied to the fuel cell 20 (step S11).

4 Claims, 2 Drawing Sheets

(56) References Cited

FOREIGN PATENT DOCUMENTS

| | | |
|---|---|---|
| JP | 2-220362 A | 9/1990 |
| JP | H06-231786 | 8/1994 |
| JP | H09-237634 | 9/1997 |
| JP | 10-326625 A | 12/1998 |
| JP | 2002-352837 A | 12/2002 |
| JP | 2003-068334 A | 3/2003 |
| WO | WO 0138780 A1 * | 5/2001 |
| WO | WO 02/33763 A2 | 4/2002 |
| WO | WO 2004000601 A1 * | 12/2003 ............. B60L 11/18 |

* cited by examiner

FUEL CELL SYSTEM WITH CONTROL OF THE PRESSURE OF THE REACTANTS WITHIN THE SYSTEM

This is a 371 national phase application of PCT/JP2006/307515 filed 4 Apr. 2006, claiming priority to Japanese Patent Application No. 2005-109858 filed 6 Apr. 2005, the contents of which are incorporated herein by reference.

BACKGROUND

The present invention relates to a fuel cell system, and in particular, to a technique for enabling a desired generation amount to be achieved even when it is difficult to provide an appropriate fuel gas supply amount for a requested gas amount such as during activation.

Efforts have been made to develop a fuel cell system comprising a fuel cell including a fuel pole and an oxidizer pole on the opposite sides of a solid polymer electrolyte membrane (hereinafter referred to as an electrolyte membrane); a fuel gas, for example, a hydrogen gas, is supplied to the fuel pole while an oxidizer gas, for example, air, is supplied to the oxidizer pole so that the fuel cell can generate electric energy directly from chemical energy resulting from the oxidation-reduction reaction between the fuel gas and the oxidizer gas.

For fuel cell systems of this type, it is necessary to control the differential pressure (hereinafter referred to as the anode-cathode differential pressure) between a fuel gas supply pressure (gas supply pressure) on the fuel pole side and an oxidizer gas supply pressure (gas supply pressure) on the oxidizer pole side to a predetermined value or smaller in order to prevent possible damage to the electrolyte membrane and to allow the electrolyte membrane to last longer. To reduce the anode-cathode differential pressure, for example, Japanese Patent laid-Open No. 2003-068334 proposes a technique for varying a set pressure for a hydrogen regulator that adjusts the fuel gas supply pressure depending on the oxidizer gas supply pressure, determined by a fuel cell load (a generation requirement on the fuel cell).

SUMMARY

Some of the fuel cell systems of this type direct a fuel off gas discharged from the fuel cell to the fuel supply system for circulation in order to increase fuel efficiency. However, the off gas circulation increases the concentration of impurities in the fuel gas. This makes it difficult to provide an appropriate fuel gas supply amount for an electric load in a system determining the supply pressure for the fuel gas in accordance with the supply pressure for the oxidizer gas as described in the above publication. On the other hand, the impurity concentration is reduced by purging (discharging) the fuel off gas to the exterior of the system at a predetermined timing. However, an extra amount of fuel gas is discharged, reducing the fuel efficiency.

Thus, an object of the present invention is to provide a fuel cell system that can provide a desire generation amount while reducing the amount of fuel gas discharged to the exterior of the system even if it is difficult to provide an appropriate fuel gas supply amount for a fuel cell load (the generation requirement on the cell).

The present invention provides a fuel cell system comprising a fuel cell having a fuel pole and an oxidizer pole, gas supply means for supplying a reaction gas to the fuel cell in accordance with a generation requirement, and gas supply pressure control means for controlling a gas supply pressure so as to maintain an anode-cathode differential pressure between the reaction gas supplied to the fuel pole of the fuel cell and the reaction gas supplied to the oxidizer pole of the fuel cell, within a predetermined range, wherein the gas supply pressure control means adjusts the gas supply pressure so as to increase the range of the anode-cathode differential pressure if the amount of reaction gas supplied to the fuel cell is equal to or smaller than a predetermined value.

With this configuration, if it is difficult to provide the appropriate reaction gas supply amount for the generation requirement on the fuel cell, the gas supply pressure is controlled so as to increase the anode-cathode differential pressure by, for example, increasing the pressure for reaction gas supplied to the fuel pole, instead of controllably maintaining the anode-cathode differential pressure within the predetermined range. This makes it possible to provide the desired reaction gas supply amount without the need for what is called a purge process of discharging a reaction off gas to the exterior.

The gas supply pressure control means may increase the range of the anode-cathode differential pressure with decreasing amount of reaction gas supplied to the fuel cell.

The gas supply pressure control means may adjust the gas supply pressure for at least one of a fuel gas supplied to the fuel pole and an oxidizer gas supplied to the oxidizer pole.

The case where the amount of reaction gas supplied to the fuel cell is equal to or smaller than the predetermined value may be a case where the amount of fuel gas supplied to the fuel pole is less than an appropriate required gas amount for the generation requirement on the fuel cell or a case where the concentration of impurities in the fuel gas supplied to the fuel pole reaches a predetermined value or greater.

The gas supply pressure control means may increase the fuel gas supply pressure if the amount of fuel gas supplied to the fuel pole is less than the appropriate required gas amount for the generation requirement on the fuel cell or if the concentration of impurities in the fuel gas supplied to the fuel pole reaches the predetermined value or greater. In particular, the latter configuration makes it possible to easily and precisely determine whether or not the fuel gas supply amount is equal to or greater than the required gas amount.

A fuel supply path between the fuel cell and a fuel supply source may have a first shut-off valve and a first pressure reduction valve disposed downstream of the first shut-off valve, and a second shut-off valve and a second pressure reduction valve disposed downstream of the second shut-off valve, the valves constituting a parallel circuit. The second pressure reduction valve may have a higher set pressure than the first pressure reduction valve. The gas supply pressure control means may control an open and close state of the first shut-off valve and the second shut-off valve so as to allow the fuel gas from the fuel supply source to selectively pass through one of the first pressure reduction valve and the second pressure reduction valve.

With this configuration, the gas supply pressure control means may increase the fuel gas supply pressure by closing the first shut-off valve while opening the second shut-off valve.

If the amount of fuel gas supplied to the fuel pole is less than the required gas amount even after the fuel gas supply pressure has thus been increased, power generated by the fuel cell may be limited.

The present invention may also provide a fuel cell system comprising control means for controlling a supply pressure for a fuel gas supplied to a fuel cell, means for determining an oxidizer gas supply pressure in accordance with a load on the fuel cell, means for controlling the fuel gas supply pressure so as to maintain an anode-cathode differential pressure between a fuel pole and an oxidizer pole within a predetermined range, and means for controlling the flow rate of a fuel gas supplied to the fuel cell, wherein if the fuel gas supply amount is determined to be less than a required gas amount, the predetermined range is increased compared to a case of normal operation, to raise the fuel gas supply pressure controlled by the control means.

With this configuration, if it is difficult to provide the appropriate fuel gas supply amount for the fuel cell load, the fuel gas flow rate is controlled by increasing the fuel gas supply pressure instead of performing the anode-cathode differential pressure control. This makes it possible to provide the desired fuel gas supply amount without the need for what is called a purge process of discharging a fuel off gas to the exterior.

Moreover, according to the present invention, the fuel gas supply amount may be determined to be less than the required gas amount if the concentration of impurities in the fuel gas reaches a predetermined value or greater.

This configuration makes it possible to easily and precisely determine whether or not the fuel gas supply amount is equal to or greater than the required gas amount.

DETAILED DESCRIPTION

Figure 1:
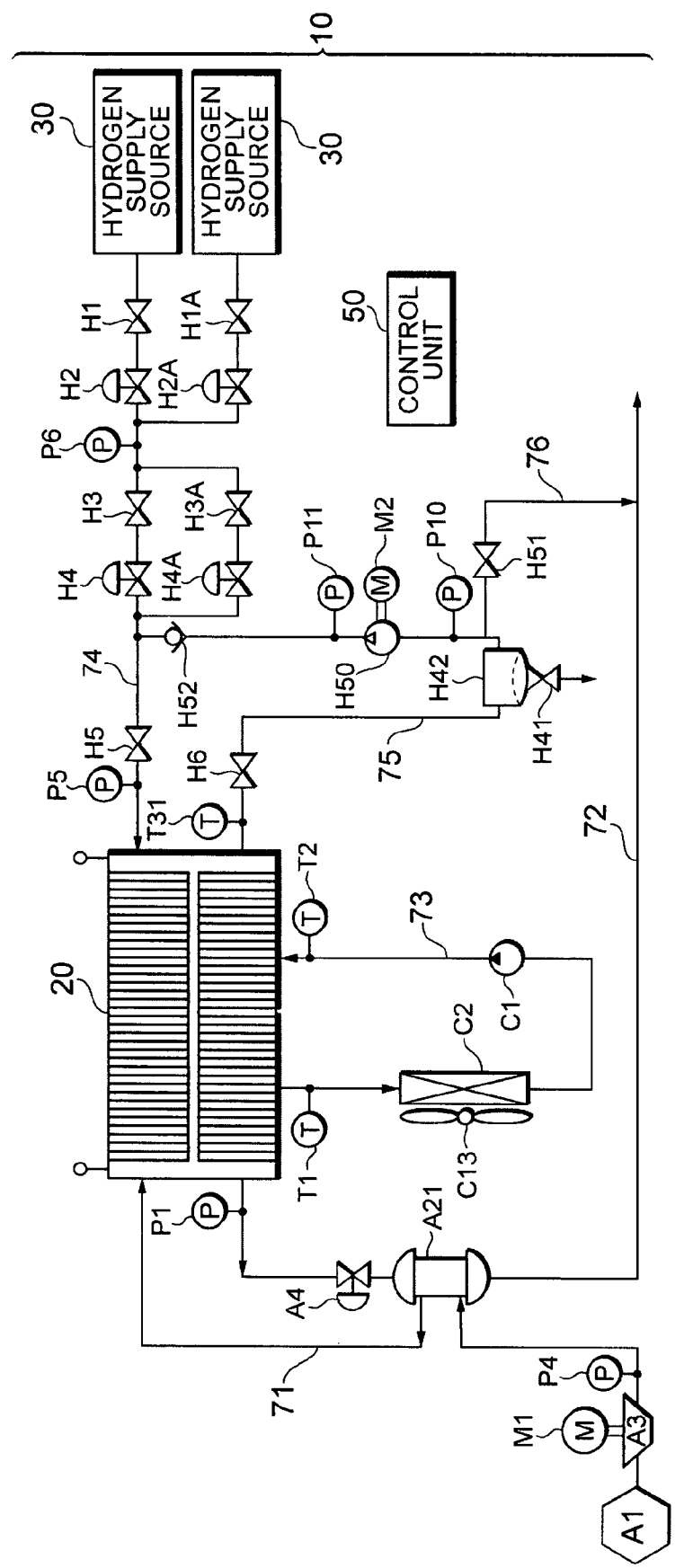
FIG. 1 is a schematic diagram showing an embodiment of a fuel cell system in accordance with the present invention.

FIG. 1 is a schematic diagram showing an embodiment of a fuel cell system in accordance with the present invention. A fuel cell system 10 is applicable not only to on-vehicle generation system for fuel cell vehicles but also to, for example, stationary generation systems.

Air (open air) as an oxidizing gas is supplied to a cathode (oxidizer pole) of a fuel cell 20 via an air supply path 71. The air supply path 71 has an air filter A1 that removes particulates from air, a compressor (gas supply means) A3 that pressurizes air, a pressure sensor P4 that detects an air supply pressure, and a humidifier A21 that adds required moisture to air. The compressor A3 is driven by a motor M1.

The motor M1 is drivingly controlled by a control unit (means for determining an oxidizer gas supply pressure, means for controlling a fuel gas supply pressure so as to maintain the anode-cathode differential pressure between a fuel pole and the oxidizer pole within a predetermined range, or gas supply pressure control means depending on a load on the fuel cell (a generation requirement on a fuel cell)) 50. The air filter A1 has an air flow meter (not shown) that detects an air flow rate.

An air off gas discharged by a fuel cell 20 is emitted to the exterior via an exhaust path 72. The exhaust path 72 has a pressure sensor P1 that detects the cathode outlet pressure of the fuel cell 20, a pressure control valve A4, and a heat exchanger for the humidifier A21. The pressure sensor P1 is provided near an air exhaust port of the fuel cell 20. The pressure control valve A4 functions as a pressure controller that sets a pressure for air supplied to the fuel cell 20. Detection signals (not shown) from the pressure sensors P4 and P1 are sent to a control unit 50.

The control unit 50 determines the supply pressure (air supply pressure) for the oxidizer gas supplied to the fuel cell 20 and adjusts the compressor A3 and the pressure control valve A4, in accordance with a load on the fuel cell 20, that is, a generation requirement on the fuel cell 20. The control unit 50 thus controls the pressure for and the flow rate of air supplied to the fuel cell 20.

A hydrogen gas as a fuel gas (reaction gas) is fed from a plurality of (in the present embodiment, two) hydrogen supply sources (gas supply means, fuel supply source) 30 to an anode (fuel pole) of the fuel cell 20 via a fuel supply path 74. The hydrogen supply source 30 corresponds to, for example, a high-pressure hydrogen tank but may be what is called a fuel modifier, a hydrogen-gas absorbing alloy tank, or the like.

The fuel supply path 74 has solenoid valves H1, H1A that feed hydrogen from the hydrogen supply source 30 or stop feeding, pressure reduction valves H2, H2A that reduce the pressure for the hydrogen gas supplied to the fuel cell 20 from a high pressure to a medium pressure, a pressure sensor P6 that detects the hydrogen gas pressure downstream of the pressure reduction valve H2, shut-off valves (control means, a part of the gas supply pressure control means, a first shut-off valve, a second shut-off valve) H3, H3A made of, for example, solenoid valves to feed hydrogen from the hydrogen supply source 30 or stop feeding, pressure reduction valves H4, H4A (control means, a part of the gas supply pressure control means, a first pressure reduction valve, a second pressure reduction valve) that reduce the pressure for the hydrogen gas supplied to the fuel cell 20 from the medium pressure to a low pressure, a solenoid valve H5 that opens and closes the section between a hydrogen supply port of the fuel cell 20 and the fuel supply path 74, a pressure sensor P5 that detects the anode inlet pressure of the fuel cell 20, and a nitrogen sensor (not shown) that detects the concentration of nitrogen (impurity concentration) in the hydrogen gas. Detection signals (not shown) from the pressure sensors P5, P6 and the nitrogen sensor are sent to the control unit 50.

In the fuel supply path 74, the shut-off valve (first shut-off valve) H3 and the pressure reduction valve (first pressure reduction valve) H4, disposed downstream of the shut-off valve H3, and the shut-off valve (second shut-off valve) H3A and the pressure reduction valve (second pressure reduction valve) H4A, disposed downstream of the shut-off valve H3A, constitute a parallel circuit. Controllably opening and closing the shut-off valves H3, H3A allow the hydrogen gas from the hydrogen supply source 30 to selectively pass through one of the pressure reduction valves H4, H4A. The pressure reduction valve H4A has a higher set pressure than the pressure reduction valve H4. In normal operation, the pressure reduction valve H4 is used. However, the use of the pressure reduction valve H4A enables the pressure for the hydrogen gas supplied to the fuel cell 20 to be increased.

That is, in the fuel cell system 10 in accordance with the present embodiment, the shut-off valve H3 and the pressure reduction valve H4, disposed downstream of the shut-off valve H3, and the shut-off valve H3A and the pressure reduction valve H4A, disposed downstream of the shut-off valve H3A, constitute control means (gas supply pressure control means) for controlling the supply pressure for the fuel gas supplied to the fuel cell 20. The "hydrogen gas" in the specification refers to any gas passing through the fuel supply path 74 regardless of the components of the gas.

An amount of hydrogen gas not consumed by the fuel cell 20 is discharged to a hydrogen circulation path 75 as a hydrogen off gas and returned to a downstream side of the pressure reduction valve H4 in the fuel supply path 74. The hydrogen circulation path 75 has a temperature sensor T31 that detects the temperature of a hydrogen off gas, an FC outlet valve H6 that allows the fuel cell 20 and the circulation path 75 to communicate with each other or blocks the communication, a gas-liquid separator H42 that recovers moisture from the hydrogen off gas, a discharge valve H41 that collects the recovered generated water in a tank or the like (not shown) located outside the circulation path 75, a hydrogen pump (means for controlling the flow rate of the fuel gas supplied to the fuel cell) H50 that pressurizes the hydrogen off gas, pressure sensors P10, P11 that detect the primary pressure and secondary pressure, respectively, of the hydrogen pump H50, and a check valve H52.

A detection signal (not shown) from a temperature sensor T31 is supplied to the control unit 50. The operation of the hydrogen pump H50 is controlled by the control unit 50. The hydrogen off gas joins to the hydrogen gas in the fuel supply path 74 and then supplied to the fuel cell 20 for reuse. The check valve H52 prevents the hydrogen gas in the fuel supply path 74 from flowing back to the hydrogen circulation path 75. The valves H1, H3, H5, and H6 and a valve H51 are driven in accordance with signals from the control unit 50.

The hydrogen circulation path 75 is connected to an exhaust path 72 through a purge path 76 via the purge valve H51. The purge valve H51 is an electromagnetic shut-off valve and operates on instructions from the control unit 50 to discharge (purge) the hydrogen off gas to the exterior. The intermittent performance of the purge operation makes it possible to prevent the disadvantageous situation in which the circulation of the hydrogen off gas is repeated to increase the concentration of impurities in the hydrogen gas on the fuel pole side, reducing a cell voltage.

A cooling path 73 is formed at a cooling water entrance of the fuel cell 20 to circulate cooling water. The cooling path 73 has a temperature sensor T1 that detects the temperature of cooling water discharged by the fuel cell 20, a radiator C2 that radiates heat from the cooling water to the exterior, a pump C1 that pressurizes and circulates the cooling water, and a temperature sensor T2 that detects the temperature of the cooling water supplied to the fuel cell 20. The radiator C2 has a cooling fan C13 that is rotationally driven by a motor.

The fuel cell 20 is configured as a fuel cell stack by stacking a required number of full cell cells (unit cells) each comprising an anode and a cathode on the opposite sides of an electrolytic film. Power generated by the fuel cell 20 is supplied to a power control unit (not shown). The power control unit comprises an inverter that drives a driving motor for a vehicle, an inverter that drives various auxiliaries such as a compressor motor and a hydrogen pump motor, and a DC-DC converter that charges a secondary battery and feeds power from the secondary battery to the motors and the like.

The control unit 50 is composed of a control computer system. The control unit 50 receives a demand load such as an accelerator opening signal for a vehicle (not shown) and control information from the sensors for the respective sections (pressure sensor, temperature sensor, flow rate sensor, output ammeter, output voltmeter, and the like) to control the operation of the valves and motors for the respective sections of the system. Specifically, the control unit 50 adjusts the rotation speed of the motor M1, which drives the compressor A3, and thus the amount of air supplied to the fuel cell 20. The control unit 50 also adjusts the rotation speed of the motor M2, which drives the hydrogen pump H50, and thus the amount of fuel gas supplied to the fuel cell 20.

Further, in normal operation, the control unit 50 controls the rotation speed of the hydrogen pump H50 so as to maintain the differential pressure (hereinafter referred to as the anode-cathode differential pressure) between the pressure for the hydrogen gas supplied to the anode of the fuel cell 20 and the pressure for air supplied to the cathode of the fuel cell 20 within a predetermined range. The anode-cathode differential pressure is controlled on the basis of the anode inlet pressure of the fuel cell 20, detected by the pressure sensor P5, and a cathode inlet pressure estimated from a pressure loss and the cathode outlet pressure of the fuel cell 20, detected by the pressure sensor P1.

However, if the control unit 50 determines that the amount of hydrogen gas supplied to the fuel cell 20 is less than the appropriate required gas amount for the fuel cell load (generation requirement), the control unit 50 controls the hydrogen gas flow rate by increasing the hydrogen gas supply pressure instead of performing the anode-cathode differential pressure control. Specifically, the control unit 50 closes the open shut-off valve H3 while opening the closed shut-off H3A to switch the circuit so that the hydrogen gas from the hydrogen supply source 30 passes through the pressure reduction valve H4A. At this time, the predetermined range of the anode-cathode differential pressure is temporarily increased.

After the switching, the pressure for the hydrogen gas supplied to the fuel cell 20 increases temporarily because the set pressure for the pressure reduction valve H4A is higher than that for the pressure reduction valve H4. As a result, since the concentration of impurities in the hydrogen gas (for example, nitrogen concentration) is equal to or greater than a predetermined value such as during activation or return from intermittent operations, even if it is difficult to provide the appropriate required gas amount for the fuel cell load (generation requirement), a desired amount of hydrogen gas can be supplied to the fuel cell 20 without the need to execute what is called a purge process of discharging the hydrogen off gas to the exterior.

Now, with reference to FIG. 2, description will be given of the control of the pressure for the hydrogen gas supplied to the control unit 50.

It is assumed that when this routine is first called, control is performed such that the shut-off valve H3 is open, while the shut-off valve H3A is closed and that the hydrogen gas from the hydrogen supply source 30 is fed to the fuel cell 20 through the pressure reduction valve H4.

First, in step S1, a nitrogen sensor (not shown) provided in the fuel supply path 74 and closer to the fuel cell 20 to measure the concentration of nitrogen (impurity concentration) in the hydrogen gas supplied to the fuel cell 20.

In the subsequent steps S3 to S5, the amount of instruction operation for the auxiliaries is calculated on the basis of the power required for the fuel cell system 10. In the description below, the rotation speed of the hydrogen pump H50 is taken as an example of the operation amount of the auxiliaries. First, in step S3, on the basis of an accelerator opening detected by an accelerator sensor, the power required for the fuel cell 20 is calculated. Then, on the basis of the required power, an instructive rotation speed specified for the hydrogen pump H50 is calculated.

Then, in step S5, since the amount of hydrogen gas supplied to the fuel cell 20 varies depending on the gas component even at the same gas flow rate, the hydrogen concentration is calculated from the concentration of nitrogen in the hydrogen gas measured in step S1. On the basis of the hydrogen concentration, the rotation speed specified for the hydrogen pump H50, determined in step S3, is corrected. After the concentration correction, the instructive rotation speed is specified for the hydrogen pump H50 (step S7) to control the amount of hydrogen gas supplied to the fuel cell 20.

The subsequent step S9 determines whether or not the amount of hydrogen gas supplied to the fuel cell 20 is equal to or greater than the appropriate required gas amount for the fuel cell load (generation requirement). According to the present embodiment, step S9 determines whether or not the nitrogen concentration measured in step S1 is equal to or greater than a predetermined value. If the measured nitrogen concentration is equal to or greater than the predetermined value, step S9 determines that the amount of hydrogen gas supplied to the fuel cell 20 is not equal to or greater than the appropriate required gas amount for the fuel cell load (generation requirement) (step S9: NO). The process then proceeds to step S11.

On the other hand, if the nitrogen concentration measured in step S1 is smaller than the predetermined value, step S9 determines that the amount of hydrogen gas supplied to the fuel cell 20 is equal to or greater than the appropriate required gas amount for the fuel cell load (generation requirement) (step S9: YES). The process then proceeds to step S13.

In step S11, the open shut-off valve H3 is closed or the closed shut-off valve H3 remains closed, whereas the closed shut-off valve H3A is opened or the open shut-off valve H3A remains open. The circuit is thus switched so as to allow the hydrogen gas from the hydrogen supply source 30 to pass through the pressure reduction valve H4A. After the switching, the pressure for the hydrogen gas supplied to the fuel cell 20 increases because the set pressure for the pressure reduction valve H4A is higher than that for the pressure reduction valve H4. This also increases the amount of hydrogen gas supplied to the fuel cell 20.

Accordingly, since the concentration of impurities in the hydrogen gas (for example, the nitrogen concentration) is equal to or greater than the predetermined value such as during activation or return from intermittent operations, even if it is difficult to provide the appropriate required gas amount for the fuel cell load (generation requirement), a desired amount of hydrogen gas can be supplied to the fuel cell 20 without the need to execute what is called a purge process of discharging the hydrogen off gas to the exterior. This enables both the improvement of fuel efficiency and the provision of the appropriate generation amount.

If the amount of hydrogen gas supplied to the fuel cell 20 is less than the required gas amount even after the switching to the pressure reduction valve H4A, then the power is limited by, for example, reducing the amount of power (output) generated by the fuel cell 20 below the generation requirement. This makes it possible to prevent the electrolyte membrane from being damaged, allowing the electrolyte membrane to last longer. Further, in providing the hydrogen gas supply amount required for generation, that part of the hydrogen gas supply amount which cannot be achieved by the rotation speed and flow rate of the hydrogen pump H50 is compensated for by increasing the hydrogen gas supply pressure. This effectively inhibits an increase in hydrogen gas supply pressure and in anode-cathode differential pressure.

In step S13, the closed shut-off valve H3 is opened or the open shut-off valve H3 remains open, whereas the open shut-off valve H3A is closed or the closed shut-off valve H3A remains closed. The circuit is thus switched so as to allow the hydrogen gas from the hydrogen supply source 30 to pass through the pressure reduction valve H4.

The embodiment of the present invention has been descried above in detail with reference to the drawings. However, the specific configuration is not limited the above embodiment. Design changes or the like may be included within the technical scope of the present invention without departing from the spirits of the present invention.

Figure 2:
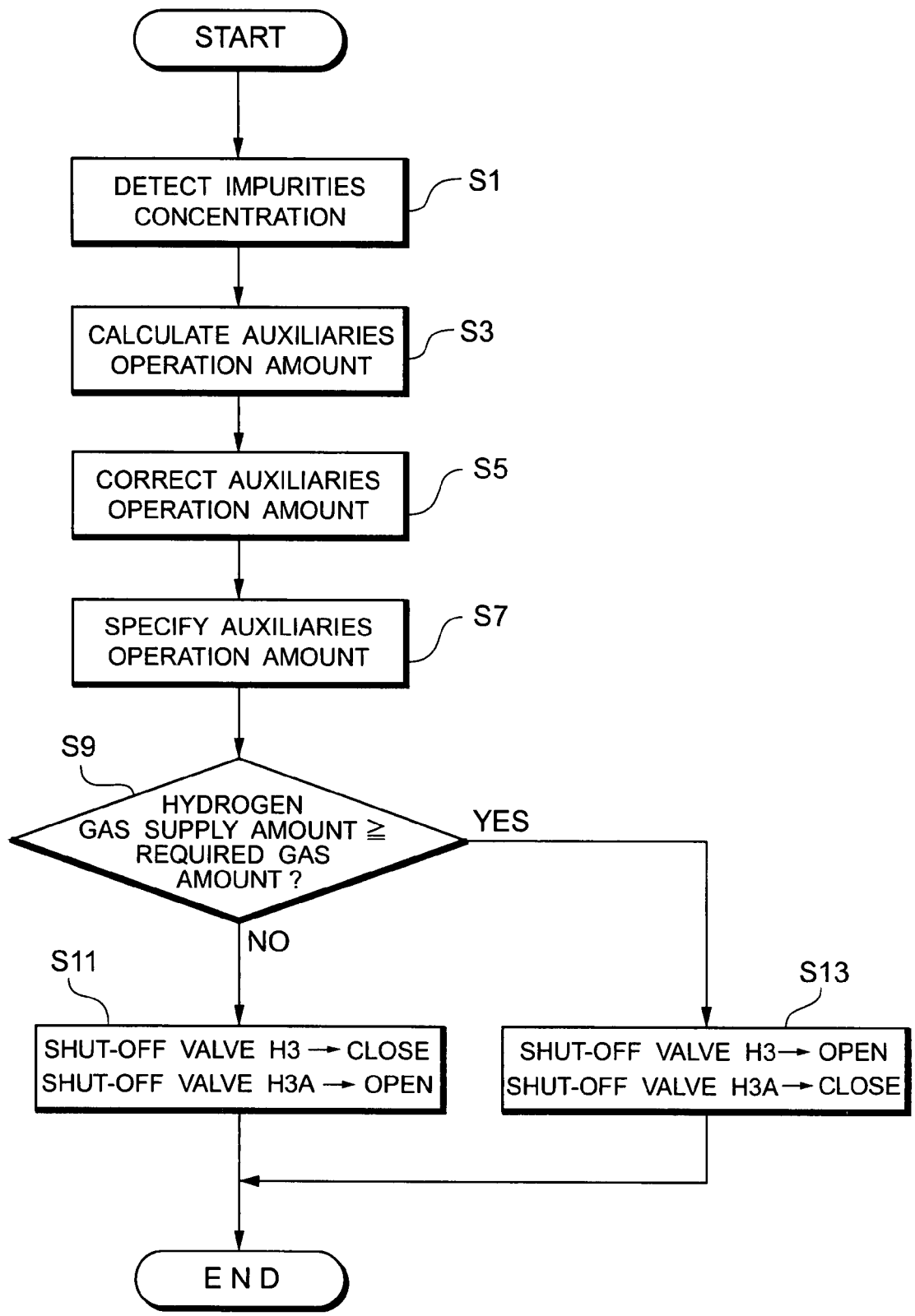
FIG. 2 is a flowchart illustrating hydrogen supply pressure control performed by a control unit shown in FIG. 1.

For example, in the above embodiment, the concentration of the nitrogen in the hydrogen gas supplied to the fuel cell 20 is measured by the nitrogen sensor (step S1 in FIG. 2). Then, determination is made of whether the nitrogen concentration is equal to or greater than the predetermined value to determine whether the amount of hydrogen gas supplied to the fuel cell 20 is equal to or greater than the required gas amount. However, instead, the concentration of hydrogen in the hydrogen gas may be measured directly by the hydrogen sensor or the hydrogen concentration is calculated back from oxygen concentration or carbon dioxide concentration measured by an $O_2$ sensor or a $CO_2$ sensor, or saturated vapor pressure based on temperature so that if the hydrogen concentration is equal to or smaller than a predetermined value, determination is made of that the hydrogen gas supply amount is not equal to or greater than the required gas amount.

Further, in the above embodiment, if determination is made of that the hydrogen gas supply amount is not equal to or greater than the required gas amount, the shut-off valves H3, H3A are controllably opened and closed to select one of the pressure reduction valves 4A, H4A through which the hydrogen gas is passed to increase the hydrogen gas supply pressure. However, the present invention is not limited to this. The circuit comprising the shut-off valve H3A and the pressure reduction valve H4A may be omitted, and the set pressure for the pressure reduction valve H4 may be replaced with one that can be sequentially controlled in accordance with control signals from the control unit 50. In this configuration, the shut-off valve H3 may also be omitted.

According to the present invention, if it is difficult to provide an appropriate amount of supplied reaction gas (fuel gas supply amount) for a generation requirement (fuel cell load) as in a transitional state, for example, activation or recovery from intermittent operations, the flow rate of the reaction gas is controlled (fuel gas flow rate control) by increasing the supply pressure for the reaction gas (fuel gas supply pressure) instead of performing anode-cathode differential pressure control. This enables the desired generation amount to be obtained while reducing the amount of reaction gas discharged to the exterior (fuel gas amount) to increase fuel efficiency.

Therefore, the present invention can be widely utilized for fuel cell systems on which the above requirements are made.

I claim:

1. A fuel cell system, comprising:
a fuel cell having a fuel pole and an oxidizer pole, gas supply device that supplies a reaction gas to the fuel cell in accordance with a generation requirement, and
gas supply pressure control unit programmed to control a gas supply pressure so as to maintain, during normal operation, an anode-cathode differential pressure between the reaction gas supplied to the fuel pole of the fuel cell and the reaction gas supplied to the oxidizer pole of the fuel cell, within a predetermined range,
wherein if the amount of fuel gas supplied to the fuel cell is equal to or smaller than a predetermined value, the gas supply pressure control unit is programmed to increase the fuel gas supply pressure compared to the normal operation so that the anode-cathode differential is temporarily increased and without the need to execute a purge process,
wherein a fuel supply path between the fuel cell and a fuel supply source has a first shut-off valve and a first pressure reduction valve disposed downstream of the first shut-off valve, and a second shut-off valve and a second pressure reduction valve disposed downstream of the second shut-off valve, the valves constituting a parallel circuit, and the second pressure reduction valve has a higher set pressure than the first pressure reduction valve, and the gas supply pressure control unit is further programmed to control an open and close state of the first shut-off valve and the second shut-off valve so as to allow the fuel gas from the fuel supply source to selectively pass through one of the first pressure reduction valve and the second pressure reduction valve, wherein the gas supply pressure control unit is further programmed to increase the fuel gas supply pressure by closing the first shut-off valve while opening the second shut-off valve, in response to the amount of the fuel gas supplied to the fuel cell being equal to or smaller than the predetermined value, and wherein the gas supply pressure control unit is further programmed to limit power generated by the fuel cell when the amount of fuel gas supplied to the fuel pole is less than the required gas amount even after increasing the fuel gas supply pressure.

2. The fuel cell system according to claim 1, wherein the gas supply pressure control unit increases the range of the anode-cathode differential pressure with decreasing amount of reaction gas supplied to the fuel cell.

3. The fuel cell system according to claim 1, wherein the predetermined value is the required amount of fuel gas that needs to be supplied to the fuel pole to satisfy the generation requirement of the fuel cell.

4. The fuel cell system according to claim 1, wherein when the amount of reaction gas supplied to the fuel cell is equal to or smaller than the predetermined value a concentration of impurities in the fuel gas supplied to the fuel pole reaches a predetermined value or greater.

* * * * *